Nov. 22, 1960 A. J. GRANBERG 2,960,758
METHOD OF MAKING A SPHERICAL PISTON ASSEMBLY FOR PUMPS
OF THE VARIABLE DISPLACEMENT TYPE AND RESULTING
SPHERICAL PISTON ASSEMBLY
Filed Sept. 18, 1956 2 Sheets-Sheet 1

INVENTOR.
ALBERT J. GRANBERG
BY
HIS ATTORNEYS

Nov. 22, 1960 A. J. GRANBERG 2,960,758
METHOD OF MAKING A SPHERICAL PISTON ASSEMBLY FOR PUMPS
OF THE VARIABLE DISPLACEMENT TYPE AND RESULTING
SPHERICAL PISTON ASSEMBLY
Filed Sept. 18, 1956 2 Sheets-Sheet 2

INVENTOR.
ALBERT J. GRANBERG
BY
Bruce & Brosler
HIS ATTORNEYS

United States Patent Office 2,960,758
Patented Nov. 22, 1960

2,960,758

METHOD OF MAKING A SPHERICAL PISTON ASSEMBLY FOR PUMPS OF THE VARIABLE DISPLACEMENT TYPE AND RESULTING SPHERICAL PISTON ASSEMBLY

Albert J. Granberg, 6001 Rockwell St., Oakland, Calif.

Filed Sept. 18, 1956, Ser. No. 610,550

3 Claims. (Cl. 29—156.5)

My invention relates to pumps of the variable displacement type having a spherical pump chamber and a spherical piston assembly therein, and more particularly relates to a method of making such piston assemblies.

Among the objects of my invention are, (1) To provide a novel and improved method of making spherical piston assemblies for variable displacement pumps;

(2) To provide a novel and improved method of making spherical piston assemblies for variable displacement pumps, which will be economical and yet which will enable a fit within close tolerances.

(3) To provide a novel and improved spherical piston assembly.

Additional objects of my invention will be brought out in the following description of a preferred form of the same taken in conjunction with the accompanying drawings, wherein Figure 1 is a view in perspective of a piston assembly to which the present invention relates;

Figure 3:
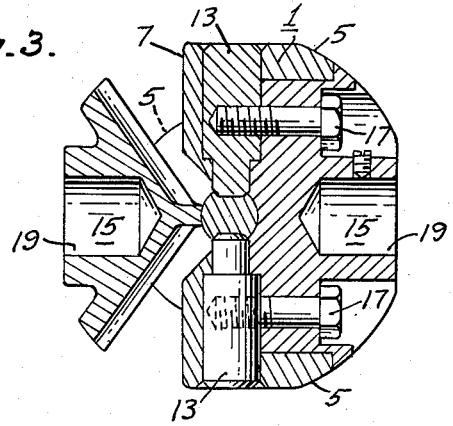
Figure 3 is another view in section through such piston assembly, taken in the plane at right angles to that of Figure 2.
Figure 2:
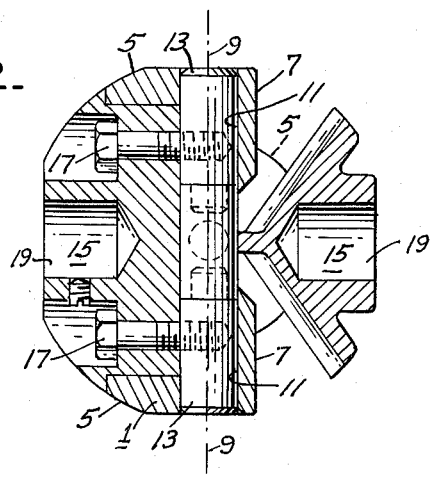
Figure 2 is a view in section through such piston assembly.
Figure 1:
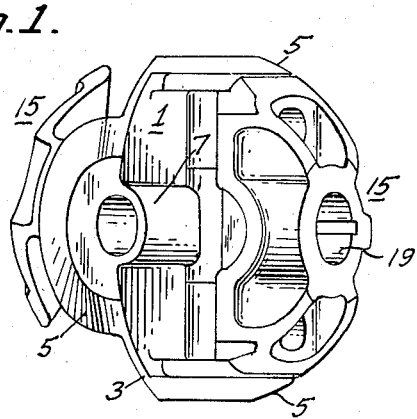
Figure 4:
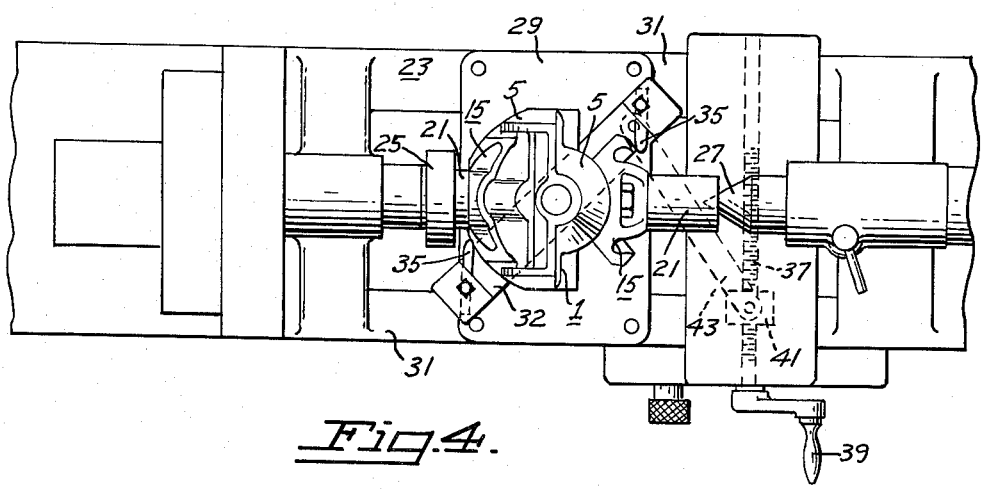
Figure 4 is a view in plan, showing such piston assembly mounted in a lathe for spherical surfacing in accordance with the present invention.

A spherical piston assembly of the type to which the present invention relates, and a variable displacement pump incorporating such a piston assembly are disclosed in the following prior patents of mine:

Rotary Pump, No. 2,211,417 of August 13, 1940;
Pump Valve, No. 2,260,805, of October 28, 1941; and
Automatic Pump Control, No. 2,475,703 of July 12, 1949.

A piston assembly of the type under consideration is depicted in the drawings to which reference will be made in describing the method involved in the present invention. Such a piston assembly involves a discoidal piston 1 having a peripheral edge 3 lying in the surface of a sphere of predetermined radius. At 90° intervals, the peripheral edge alternately deviates in direction to form semi-circular valve faces 5 without however, departing from the aforementioned spherical surface.

Opposing each such deviation, the discoidal piston is formed with a semi-cylindrical boss 7 whose axis 9 coincides with a diameter of the piston. By drilling axially of these bosses, cradle bearings 11 are formed lying on diameters which are at right angles to one another with the cradle bearings of one diameter facing from one side of the discoidal piston while the others face in the opposite direction.

Each cradle bearing is adapted to receive a hinge pin 13. Such hinge pins, make it possible to hingedly secure to the discoidal piston, at each side thereof, but at right angles to each other, a spherical segment 15. Each spherical segment is securely anchored to diametrically aligned hinge pins by means of bolts 17, the spherical segments having their surfaces recessed to submerge the heads of each of such bolts.

Each such spherical segments, furthermore is provided with a shaft socket 19 centrally thereof. In a pump assembly, one such spherical segment receives the end of a drive shaft (not shown) which is maintatined at an angle to the drive shaft to realize proper functioning of the pump, all as disclosed in the previously cited patents of mine and not constituting part of the present invention.

In making the piston assembly in accordance with the method of the present invention, the discoidal piston and the spherical segments are each cast separately and to a radius slightly greater than the desired radius of the finished piston assembly. All drilling and all surfacing within the confines of the spherical surface of each of such elements is done first, and the spherical segments are then assembled to the discoidal piston.

Following this, a stub shaft 21 is fixed in each of the spherical segments and the assembly is then mounted for rotation in a lathe 23 by securing the free end of one of the stub shafts in a chuck 25 and mounting the free end of the other on a dead center 27 with both stub shafts in absolute alignment. The hinge connections of the spherical segments to the discoidal piston permit of such mounting, and with the one stub shaft solidly anchored in the chuck, and with the other on the dead center, alignment of the stub shafts will be maintained during such rotation.

With the piston assembly in rotation, conditions are then favorable for spherically surfacing the assembly as by arcuately swinging a cutting tool about the center of the assembly and on a radius of curvature corresponding to the radius desired in the finished piston assembly.

This operation may be accomplished by a manually controllable cutting tool mounting involving a plate 29 spanning the ways 31 of the lathe directly below the piston assembly, and supporting a cutting tool mounting arm 32 of an axis 33 which passes through the center of the piston assembly. At each end of this arm is mounted a cutting tool 35 with its cutting edge at the desired radius from the center of swing.

Adjacent the plate which supports the cutting tool arm, and disposed transversely of the lathe, is a worm 37 which at one end carries a handle 39 for manually rotating the same. On this worm is threadedly mounted a carriage 41 which is coupled to the tool mounting arm by a connecting link 43. Manual rotation of the screw will result in an angular shifting of the tool mounting arm and in a direction depending upon the direction of rotation of the screw. With the cutting tools initialled positioning on a diameter transversely of the lathe, and with the piston assembly in rotation, it will be apparent that an angular adjustment of the tool mounting arm will cause one cutting tool to spherically trim one-half of the piston assembly, while the other cutting tool will simultaneously function with regard to the other half, and that an angular shift of under 90°, of the tool mounting arm will result in surfacing the entire piston assembly. The spherical character of the surface will be accurate and can be held to very close tolerances. Following such surfacing and upon removal of the stub shafts from the piston assembly, the assembly is then ready for installation in a pump.

From the foregoing description of my invention, it will be apparent that the method illustrated and described and the completed piston assembly fulfill all the objects of my invention, and while I have described such method and assembly in considerable detail, it becomes apparent that the same may be subject to alteration or modification without departing from the underlying prin-

I claim:

1. The method of making a piston assembly involving a discoidal piston having a periphery lying in the surface of a sphere of predetermined radius, a spherical segment of similar radius hingedly connected to said discoidal piston on one side and along a diameter thereof and a like spherical segment hingedly connected to said discoidal piston along a diameter on its other side and at right angles to said first spherical segment, each of said spherical segments having a shaft socket therein; said method comprising casting said discoidal piston and spherical segments to a radius slightly greater than the desired radius of the finished assembly, hingedly connecting said spherical segments to said discoidal piston, mounting said assembly for rotation in a lathe with said shaft sockets in alignment, rotating said assembly and while rotating said assembly, arcuately swinging a cutting tool into cutting contact with said assembly about the center of said assembly and on a radius of curvature corresponding to the radius desired in the finished piston assembly.

2. The method of making a piston assembly involving a discoidal piston having a periphery lying in the surface of a sphere of predetermined radius, a spherical segment of similar radius hingedly connected to said discoidal piston on one side and along a diameter thereof and a like spherical segment hingedly connected to said discoidal piston along a diameter on its other side and at right angles to said first spherical segment, each of said spherical segments having a shaft socket therein; said method comprising casting said discoidal piston and spherical segments to a spherical radius slightly greater than the desired radius of the finished assembly, hingedly connecting said spherical segments to said discoidal piston, assembling a stub shaft in each of said shaft sockets, mounting said assembly for rotation in a lathe with one of said stub shafts in a chuck and the other on a dead center in alignment with said first stub shaft, rotating said assembly and while rotating said assembly, arcuately swinging a cutting tool into cutting contact with said assembly about the center of said assembly and on a radius of curvature corresponding to the radius desired in the finished piston assembly.

3. The method of making a piston assembly involving a discoidal piston having a periphery lying in the surface of a sphere of predetermined radius, a spherical segment of similar radius hingedly connected to said discoidal piston on one side and along a diameter thereof and a like spherical segment hingedly connected to said discoidal piston along a diameter on its other side and at right angles to said first spherical segment, each of said spherical segments having a shaft socket therein; said method comprising casting said discoidal piston and spherical segments to a radius slightly greater than the desired radius of the finished assembly, hingedly connecting said spherical segments to said discoidal piston, assembling a stub shaft in each of said shaft sockets, mounting said assembly for rotation in a lathe with one of said stub shafts in a chuck and the other on a dead center in alignment with said first stub shaft, rotating said assembly and while rotating said assembly, arcuately swinging a pair of cutting tools into cutting contact with said assembly about the center of said assembly starting from opposite ends of a diameter substantially transverse of said lathe and on a radius of curvature corresponding to the radius desired in the finished piston assembly.

References Cited in the file of this patent
UNITED STATES PATENTS

| | | |
|---|---|---|
| 359,380 | Ballou | Mar. 15, 1887 |
| 1,240,530 | Baird | Sept. 18, 1917 |
| 1,818,084 | Nelson | Aug. 11, 1931 |
| 1,956,001 | Brown | Apr. 24, 1934 |
| 2,160,732 | Haynes | May 30, 1939 |
| 2,375,923 | Johnson | May 15, 1945 |
| 2,744,802 | Strayer | May 8, 1956 |
| 2,779,644 | Lovatt | Jan. 29, 1957 |